May 1, 1962 D. EIGEN ET AL 3,032,652

RECEIVERS FOR THE RECEPTION OF ELECTROMAGNETIC WAVES OF ANY DESIRED FREQUENCY

Filed March 16, 1959 2 Sheets-Sheet 1

DAVID EIGEN
ROBERT W. PEER
INVENTORS.
BY James G. Bethell
ATTORNEY.

DAVID EIGEN
ROBERT W. PEER
INVENTORS
BY James G. Bethell
ATTORNEY 3,032,652

RECEIVERS FOR THE RECEPTION OF ELECTROMAGNETIC WAVES OF ANY DESIRED FREQUENCY

David Eigen and Robert W. Peer, Passaic, N.J., assignors to The Okonite Company, Passaic, N.J., a corporation of New Jersey Filed Mar. 16, 1959, Ser. No. 799,791
3 Claims. (Cl. 250—20)

Figure 1:
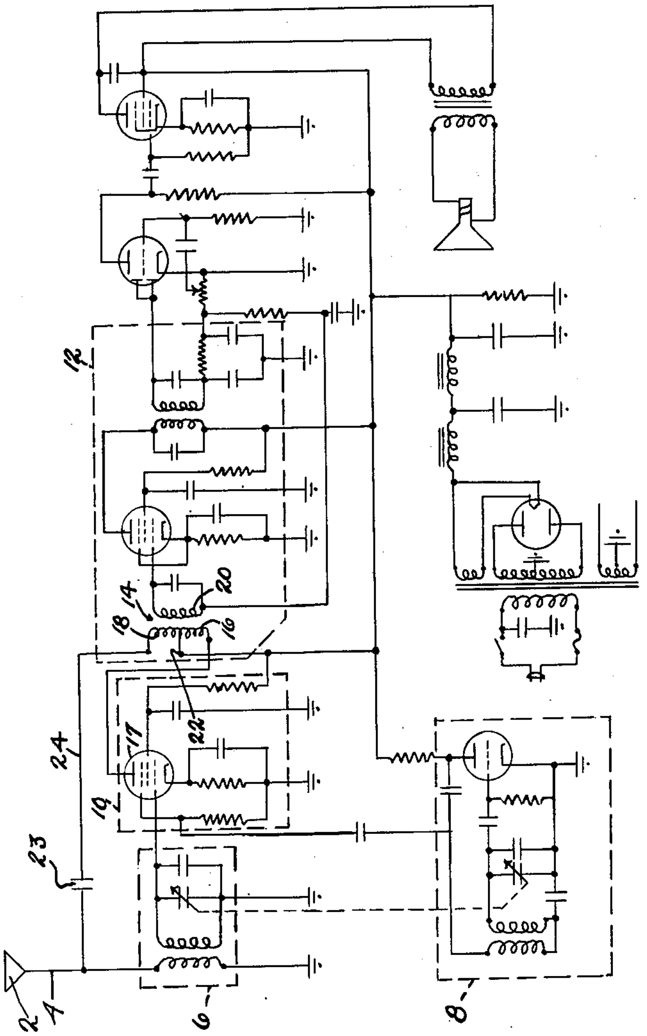

Our invention relates to receivers for the reception of electromagnetic impulses of any frequency. Receivers of this general type are commonly used in the reception of amplitude-modulated radio, television, and similar signals transmitted through the atmosphere or through space outside the atmosphere from a source relatively remote from the receiving apparatus.

Existing apparatus for the reception of such signals, hereinafter referred to as "desired signals," also pick up undesired electromagnetic impulses, hereinafter referred to as "noise." If the ratio of the strength of pickup of the desired signal to the strength of pickup of noise is high, the desired signal can be clearly recorded, displayed, heard, seen, or otherwise made to be understood, or can be used faultlessly, when sufficiently amplified, rectified, and fed into the proper transducer, to operate control mechanisms. Such a signal is said to be of high quality. On the other hand, if the ratio of the desired signal to noise is low, amplification does not increase the clarity of the desired signal, because, when the desired signal is amplified, the noise is also amplified in an equal ratio. Under these conditions, understanding of the desired signal is difficult or impossible, and when such desired signals are used to operate control or metering mechanisms, they often give faulty operations. Such signals are said to be of low quality.

An object of our invention is to provide means whereby the effects of noise emanating from without the receiver will be substantially cancelled before reaching the transducer, thus leaving a clear, high-quality desired signal for operating the transducer.

A further object of our invention is to provide means within the receiver for attainment of a high ratio of desired signal to noise from a low-quality signal pickup, thereby permitting great amplification while attaining high quality of the desired signal for actuation of the transducer.

Another object of our invention is to provide a receiving apparatus which will permit the transmitter power for transmitting the desired signal over any given distance to be reduced to a substantial degree as compared with existing apparatus.

A further characteristic inherent in our receiver is its ability satisfactorily to receive weak signals, even under conditions where noise signals are predominant, thereby permitting greater distance of signal transmission with the same power.

A still further object of our invention is to provide a receiving apparatus which will permit satisfactory communications even when atmospheric noise conditions are so severe as otherwise to render the transmission ineffective.

Another object of our invention is to provide a receiver which will greatly increase reliability of operation of metering and control mechanisms and other intelligence transmssion apparatus for space missiles and space exploration devices and permit the use of lower-power and, hence, lighter-weight transmitters in such devices.

Figure 6:
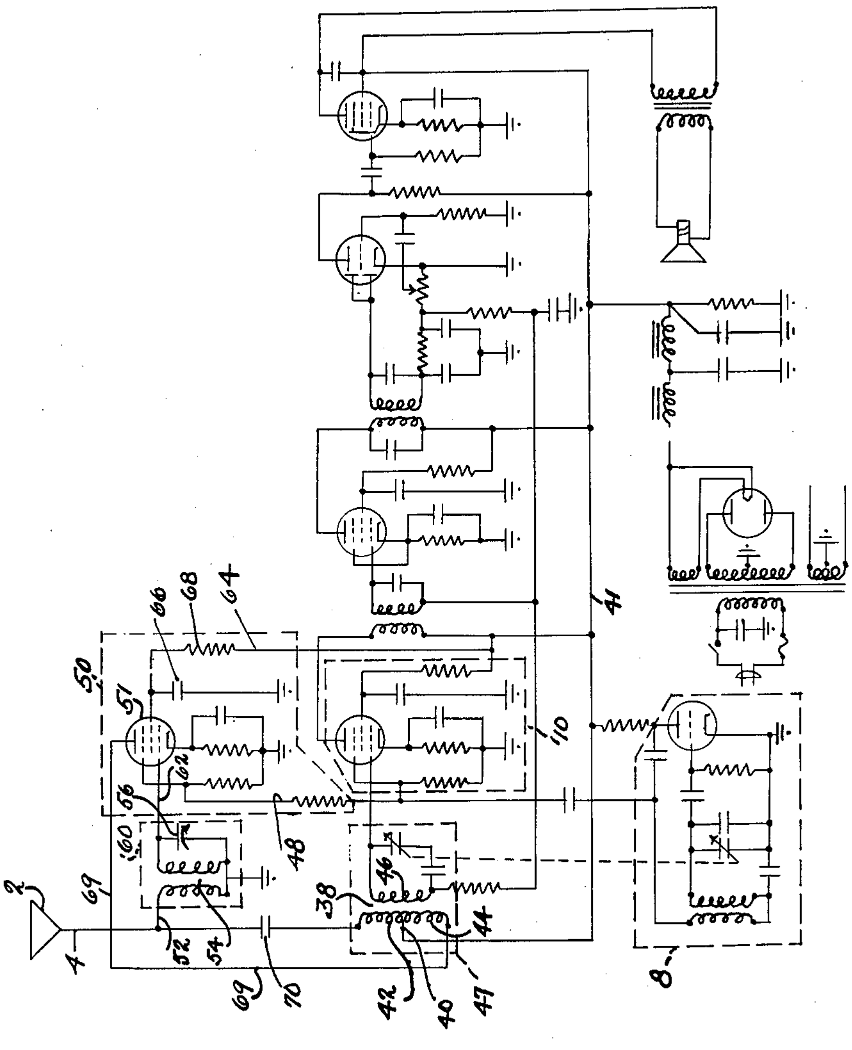
Figure 7:
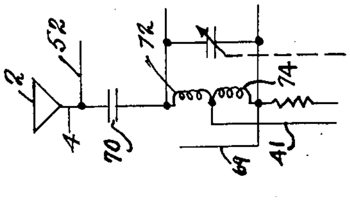
Figure 8:
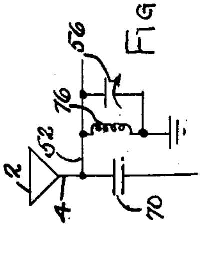

In the accompanying drawings,

FIG. 1, which includes a typical wiring diagram of a simplified superheterodyne circuit, illustrates one embodiment of our invention;

FIGS. 2, 3, 4, and 5 are diagrammatic showings of further embodiments of our invention as applied to the showing in FIG. 1;

FIG. 6 is a diagrammatic showing of still another embodiment of our invention; and FIGS. 7 and 8 are diagrammatic showings of further embodiments of our invention as applied to FIG. 6.

In the superheterodyne principle of reception the modulated carrier wave of the desired signal is first changed into a predetermined intermediate frequency, after which the desired signal at this predetermined intermediate frequency is amplified, rectified, and transduced, or it may be further amplified after rectification and then transduced.

In the United States and elsewhere there are frequencies on which there is no broadcasting, and under the superheterodyne principle of reception the carrier wave of the desired signal is changed to an intermediate frequency. The aforesaid intermediate frequency may be chosen to be one of these broadcast-free frequencies. In conventional superheterodyne radio receivers the carrier wave of the desired broadcast signal is converted into 455 kc., for example, and the converted signal is then amplified and detected. Television and other communication media similarly use other intermediate-frequency bands.

One advantage of the superheterodyne principle is that the amplifiers of a superheterodyne receiver can be permanently adjusted to respond to an intermediate frequency so as to amplify, at this single frequency, a desired signal which is being broadcast at any one of the many different broadcast frequencies. Such amplification is accomplished without the various amplification stages of the receiver having to be adjusted to change reception from one broadcast frequency to another. The one tuning knob of a superheterodyne receiver controls the tuning circuit of the receiver to respond to the frequency of the desired modulated sine wave carrier signal. Ths knob also simultaneously controls a local oscillator, which is in continual oscillation at a frequency of 455 kc., for example, either above or below the frequency to which the tuning circuit is adjusted to respond. The modulated signal from the tuning circuit and the oscillation signal from the local oscillator are both fed into a mixer tube, where the modulated sine waves of the desired signal and the unmodulated sine wave from the oscillator are mixed. These two frequencies, as well as frequencies representing the sum of and the difference in frequency of the two signals appear at the plate of the mixer. The following stages of amplification are all tuned to 455 kc., for example, or other intermediate frequency, so that this frequency is accepted by the equipment, amplified, detected, and used to actuate the transducing means. All other frequencies cause no response in the intermediate-frequency part of the circuit and can be said to be rejected.

While the superheterodyne receiver was a big step forward in reception of electromagnetic waves, even it picks up noise impulses, as above explained, which are mixed with and undesirably further amplitude-modulate the frequency leaving the tuning circuit. This undesirable modulation is carried through the mixer tube into the intermediate-frequency components of the receiver and often obscures the desired signals reaching the transducer.

We have found that these various undesired electromagnetic impulses are of a very random nature and contain energy components which will shock a resonant circuit into oscillation, even though the resonant circuit may be tuned to only a specific single frequency. We have found also that oscillation can be initiated with approximately equal vigor by the same noise impulse and can be made to decay at the same rate, even though each of two separate resonant circuits may be tuned to specific frequencies widely spaced from each other.

Our invention utilizes these findings to neutralize the undesirable part of the modulation of the desired signal by providing the intermediate frequency components of the receiver with a second path through which the noise impulses may be introduced to cause modulation of the desired signal, in opposition to modulation caused by noise impulses entering the receiver through the normal path. This second path contains means to provide 180-degree phase displacement from the normal path. The second-path noise impulse modulations being 180 degrees phase-displaced from and of approximately the same vigor as the normal-path noise impulse modulations, the noise impulse modulations entering the receiver via one path and those entering the receiver via the other path neutralize each other, leaving a correctly modulated desired signal.

Referring to the drawings in detail,

FIG. 1 shows a schematic wiring diagram of a typical superheterodyne circuit, as modified by our invention, 2 designating the antenna and 4 the antenna lead. For simplicity and clarity, the tuning circuit, the local oscillator, the mixer circuit including the mixer tube, and the intermediate-frequency components have been enclosed in dotted lines and designated 6, 8, 10, and 12, respectively. The other elements of the receiver, such as detector, audio amplifier, transducer, and power supply are shown by typical conventional symbols but not further identified, as they are widely understood by those skilled in this art.

In this embodiment of our invention we have provided the transformer 14, which is one of the elements of the intermediate-frequency components 12, with two identical and closely coupled, preferably bifilar wound, primary windings 16 and 18. 20 designates the usual secondary winding conventionally coupled to the primary windings. One end of the primary winding 16, as seen in FIG. 1, is connected to the plate of mixer tube 17 and its opposite end to junction 22, to which is also connected the source of plate supply voltage and A.-C. ground, as shown. One end of the other primary winding 18 of the transformer 14 is connected to lead 4 of the antenna 2 by means of a lead 24, while the opposite end of the primary winding is connected to the junction 22. An isolating capacitor 23 is inserted in the lead 24 between primary winding 18 and the junction of lead 24 with antenna lead 4.

The connection of primary winding 16 to the plate of mixer tube 17 and the connection of primary winding 18 to the antenna lead 4 are so chosen that an impulse entering primary winding 16 at that end which is connected to the plate of the mixer tube 17 and proceeding through the winding to the junction 22, and the same impulse entering winding 18 at that end which is connected to the antenna lead 4 and proceeding through the winding to the junction 22 will tend to set up magnetic fields of opposite polarity in the transformer 14; therefore, identical and in-phase impulses simultaneously entering primary winding 16 and primary winding 18 will exactly cancel each other, so that no electrical impulse therefrom will be imposed on the secondary winding 20 of the transformer.

It will be appreciated that the desired signal enters the receiver through the antenna 2 and proceeds through antenna lead 4 and tuning circuit 6, and, as explained earlier, there are undesired amplitude modulations of the tuned waves of energy leaving the tuning circuit. These undesired modulations are due to noise impulses. The desired modulated signal with the additional undesired modulation just mentioned is mixed in the mixer circuit 10 with the frequency emanating from local oscillator 8.

As previously pointed out, the transformer 14 and its associated intermediate-frequency components 12 accept only the predetermined intermediate frequency, the other frequencies emanating from the mixer circuit causing no response in the intermediate-frequency components 12. This invention distinguishes from conventional receivers, where the transformer 14 has only one primary winding and the responses in the intermediate-frequency components 12 are undesirably amplitude-modulated by the noise impulses transmitted to the components 12 through the mixer circuit 10, tuning circuit 6, antenna lead 4, and antenna 2.

To overcome the undesirable part of the modulation of the 455 kc. or other broadcast-free frequency, we provide transformer 14 with the additional primary winding 18, connected as above explained, through which the noise impulse at the random frequency is introduced into the transformer.

Since there are no broadcasts at the selected intermediate frequency, it will be appreciated that only those components of the noise impulses which will shock the selected intermediate-frequency resonant circuit into oscillation will be accepted and cause response in the intermediate-frequency components 12. However, any such response is in phase opposition to the response of components 12 caused by the same impulse entering the primary winding 16. Therefore, the resultant responses of components 12 are due only to the mismatch of phase angle and intensity of such impulses entering the transformer 14 through the two primary windings.

We have found that with simple circuits the lead 24 can be generally connected directly from the winding 18 to the antenna lead 4 through the isolating capacitor 23, so that with a properly constructed transformer 14 the mismatch of phase angle or intensity of impulses due to noise is so slight as to be negligible, practically all noise being cancelled.

However, to provide for applications of the cancellation of signal in circuits where the above arrangement would not be adequate, or to provide finer adjustment of the cancellation, or to compensate for transformer inaccuracies, we may employ a phase-shifter 26 (see FIG. 2) in the lead 24 to adjust electrical constants of the lead 24, so that the phase angle and intensity of the 455 kc. or other intermediate-frequency components of the noise impulse reaching the transformer secondary winding 20 through the primary winding 18 will be of exact proportion to cancel that reaching secondary winding 20 through primary winding 16. The phase-shifter 26 may take many forms, all of which are contemplated. In the form illustrated in FIG. 2 we provide an inductance 28, shunted by a resistor 30. The inductance 28 may be fixed and the resistor adjustable or vice versa. In the phase-shifter illustrated in FIG. 3 we provide a condenser 32, shunted by a resistor 30. The condenser may be fixed and the resistor adjustable or vice versa. Any of these arrangements, it will be appreciated, permit adjustment of phase angle and intensity of the impulses flowing along the lead 24 to the transformer 14.

Figure 5:
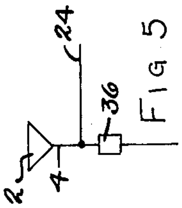
Figure 4:
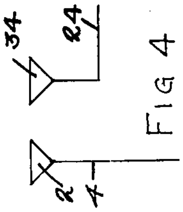

In those applications of our principle to circuits where the various adjustments of the tuning circuit to select broadcast signals of different frequencies cause intolerable interaction between the tuning circuit 6 and the transformer 14 along the antenna lead 4 and the lead 24, said interaction can be eliminated by the arrangement shown in FIG. 4, wherein we provide an antenna 34 in addition to the conventional antenna 2. The additional antenna 34 is connected to the lead 24. It is important that the antenna 2 and antenna 34 be similarly oriented in order that they similarly respond to noise impulses originating from the same direction. It is not necessary, however, that the two antennas be the same in size, as amplification or attenuation can be accomplished within the receiver by the means indicated herein or by other well known means. A slight physical separation of the two antennas effectively decouples the antennas and thereby prevents interaction between the tuning circuit 6 and transformer 14 along the antenna lead 4 and lead 24. Alternatively, as shown in FIG. 5, this interaction can be adequately prevented by placing a decoupling impedance 36 in the antenna lead 4 between the tuning circuit 6 and the junction of lead 24 with antenna lead 4. This decoupling impedance 36 can be a resistance or an inductance or a capacitance or a combination of these elements, as convenience or economy dictates.

It is to be understood that the use of the phase-shifter 26 is not to be confined to the single-antenna arrangement illustrated, but it can be used in conjunction with the dual-antenna arrangement shown in FIG. 4. It is also to be understood that both the phase-shifter 26 and the decoupling impedance 36 may be used in connection with a single antenna in the practice of our invention.

From the foregoing it will be appreciated that we have provided means to supply intermediate-frequency oscillations which are amplitude-modulated only by the desired signal and are free of all undesired modulations. When these modulated oscillations are further amplified, detected, and transduced, a clear, clean, high-quality response of the transducer can be attained, regardless of severity of the noise signals in the atmosphere or in the vicinity. The transducing means may, of course, be any of the conventional visual, audio, or recording devices, or may be a mechanical device for initiating action, for example a valve closer, cam adjuster, or plunger actuator, etc.

As can be noted from FIG. 1, circuits in accordance with our invention require only one knob to tune the set.

While we have shown the opposing noise signal introduced at the first intermediate-frequency stage, it will be appreciated that the opposing noise signal may be introduced, prior to detection, at any desired later stage of amplification. However, such later introduction complicates to some extent the exactness of equipment required for perfect cancelling of unwanted noise. Then, too, the introduction of the opposing noise signal at the earliest possible position keeps to a minimum the additional equipment required. Introduction of the opposing noise signal at the earliest possible position makes unnecessary the useless amplyifying of undesired signals, thereby reducing load on succeeding amplifiers and other components and/or permitting greater output of the desired signal per stage of amplification.

It is common practice in more intricate superheterodyne circuits to use one or more stages of pre-amplification before conversion to the intermediate frequency. In such receivers we contemplate that suitable pre-amplification will also be introduced into the lead 24.

It is to be understood that, while the transformer 14 has been shown with secondary winding 20, this winding may be eliminated by connecting the two leads of this secondary to the ends of primary windings 16 and 18.

In some cases, whether pre-amplification is used or not, it may be desired to perform the cancellation of the noise impulse energy at a still earlier position than that already referred to. Therefore, we have made provision, in the embodiment illustrated in FIG. 6, for effecting cancellation in the tuning coil.

Referring to FIG. 6, 2 designates an antenna and 4 the antenna lead connected to the primary winding 42 of antenna tuning coil 38, thence to junction 40 with A.-C. ground on plate voltage buss 41. The antenna tuning coil 38 is center-tapped to provide two primary windings 42 and 44. These two primary windings are closely coupled to the secondary winding 46 of the coil. It will be appreciated, of course, that the primary windings 42 and 44 and secondary winding 46 are parts of the tuning circuit 47. Except for the above-mentioned primary coil duplication and connection in the tuning circuit 47, the pre-amplifiers (not shown), local oscillator 8, mixer circuit 10, intermediate amplifiers, rectifier, audio amplifiers, and transducing means may be any of the suitable conventional arrangements.

In addition to the modification of the tuning coil 38, we provide a lead 48 for introducing the frequency generated by the local oscillator 8 into a second mixer circuit 50. As will be seen from FIG. 6, a lead 52 extends from the antenna lead 4 to a tuned coil 54. This coil is of such characteristics, or is equipped with one or more condensers 56 of proper characteristics, to provide a resonant circuit 60, which will resonate at the frequency of the selected intermediate-frequency stages of the receiver. This frequency, as repeatedly pointed out above, may be 455 kc., for example. Response of the tuned circuit 60 occurs only when impulses which will shock the selected intermediate-frequency tuned circuit are impinged upon it. However, since the selected intermediate frequency is broadcast-free, responses in this circuit 60 are due only to noise impulses. These responses are conveyed by lead 62 to mixer circuit 50, where they are mixed with oscillations from the local oscillator 8. The oscillations from the local oscillator are conveyed to the mixer circuit 50 through the lead 48. A lead 64 from A.-C. ground and plate voltage buss 41 to tube 51 of the mixer circuit 50 supplies screen voltage to the tube. The usual by-pass condenser 66 and screen dropping resistor 68 are also used. From the plate of tube 51 of the mixer circuit 50 lead 69 conveys the resultant frequencies to one end of the primary winding 44 of tuning coil 38, and thence to the junction 40 and A.-C. ground through buss 41. D.C. plate voltage is supplied to the plate of tube 51 of the mixer circuit 50 in a reverse direction through this same path. An isolating capacitor 70 is inserted in the antenna lead 4 between the primary winding 42 and the junction of lead 4 with lead 52.

The connection of the primary winding 42 of the tuning coil 38 to the antenna lead 4 and that of the primary winding 44 of the tuning coil to the plate of mixer tube 51 are so chosen that an impulse entering the winding 42 from the end which is connected to aerial lead 4 and proceeding through the winding to the junction 40, and the same impulse entering the winding 44 from the end which is connected to the plate of mixer tube 51 of the mixer circuit 50 and proceeding through the winding to the junction 40 will tend to set up magnetic fields of opposite polarity in the antenna tuning coil 38. Therefore, identical and in-phase impulses simultaneously entering the windings 42 and 44 will exactly cancel each other, so that no electrical impulse therefrom will appear in the secondary winding 46.

It will be appreciated that, were the lead 69 disconnected from the primary winding 44 of the tuning coil, the responses of the conventional parts of the circuit to signals striking the antenna 2 would be those due to the desired signal to which the tuning circuit 47 is tuned to resonate, distorted by undesired amplitude modulations of the desired signal due to the shock of the tuning circuit 47 by components of noise impulses effective at that frequency to which the tuning circuit 47 is at the moment adjusted, but by attaching lead 69 to winding 44, as above explained, we remove or cancel these undesired modulations.

As can be noted from FIG. 6, circuits in accordance with our invention require only one knob to tune the set.

It is to be appreciated that the local oscillator 8 oscillates at a frequency of a predetermined value, either above or below that to which the tuning circuit 47 is at any setting tuned to respond. This predetermined value may be 455 kc., for example, or other selected broadcast-free frequency. Since there are no broadcasts at the selected intermediate frequency, it will be appreciated that only those components of the noise impulses which will shock the resonant circuit 60 into oscillation will cause the tuned circuit to respond. This provides output from the tuned circuit 60 of pure noise, at the selected intermediate frequency, conveyed to the mixer circuit 50 by lead 62. In the mixer circuit we mix this output from tuned circuit 60 and the output of local oscillator 8. Four frequencies result from such mixing. Among the frequencies available at the plate of the tube 51 of mixer circuit 50 is a reconstructed pure noise signal, which is identical in frequency to that at which the tuning circuit 47 may be set at any time. This reconstructed signal of pure noise is conveyed by the lead 69 to the primary winding 44 of the antenna tuning coil 38 and through this primary winding to the junction 40. This reconstructed signal of pure noise tends to set up magnetic fields in opposition to the magnetic fields which tend to be set up by the components of the noise signal, effective at the broadcast frequency, which enter the tuning coil 38 in the conventional manner through the winding 42. Thus, there is no response, due to the noise signal, in the secondary winding 46 of the tuning coil.

Figure 3:
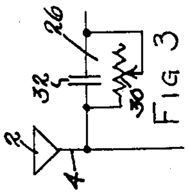
Figure 2:
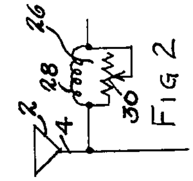

We have found that the phase angle and intensity of the reconstructed noise signal, conveyed to the winding 44 of the tuning coil by the lead 69 direct from the mixer circuit 50, is generally of satisfactory match to those of the noise energy components at broadcast frequency entering the winding 42 of the tuning coil to provide satisfactory cancelling of noise. However, when objectionable mismatch occurs, it is understood that phase angle and intensity may be adjusted by suitable resistors, reactors, or capacitance in the lead 69, or by combinations of these devices in the lead 69 similar to those inserted in the lead 24 of FIG. 1, as shown in FIGS. 2 and 3.

Where decoupling is desirable, the decoupling may be accomplished by employing a second antenna 34, connected to the lead 52 of this embodiment, similar to the second antenna 34 connected to lead 24 of the previous embodiment and shown in FIG. 4. Decoupling may also be accomplished by insertion of decoupling impedance 36 in the lead 4 between the primary winding 42 and the junction of lead 52 with lead 4. The decoupling impedance 36 of this embodiment is similar to that shown in FIG. 5 in connection with the previous embodiment.

Intensity can also be controlled, of course, by turns-ratio or coupling of tuned coil 54 or by resistors inserted in appropriate locations within the circuit.

Although the tuning coil 38 as illustrated in FIG. 6 comprises two primary windings and a secondary winding, our invention is also operable with circuits where the secondary winding is omitted and two opposing, closely coupled primary windings 72 and 74 only are used, as shown in FIG. 7. Likewise, the tuned coil 54 of FIG. 6 may consist of one winding 76 only, as shown in FIG. 8.

Although we have, for clarity, explained the polarity of the opposing coils 42 and 44 as being in exact opposition, this assumes that the impulse, being conveyed to the opposing coils by two separate paths, is of similar polarity in the two paths when it reaches the opposing coils. However, as can be understood, we may provide for phase inversion by reversing one winding of tuned coil 54 of FIG. 6, for example.

As above noted, our receiver is usable for radio, television, telemetering, or other intelligence, or remote-control applications where the signal must be transmitted through air or through space outside the atmosphere, and since weak signals can be satisfactorily separated from high levels of noise impulses, it will be appreciated that, on receivers within space missiles and other devices, the receivers will correctly actuate the control devices from ground signals which would not otherwise be of satisfactory quality. Conversely, the transmitters carried by such devices can be of smaller power and lighter weight if our receiver is employed on the ground to receive signals from the missiles.

It is to be understood that changes may be made in the details of construction and arrangement of parts hereinabove disclosed within the purview of our invention.

What we claim is:

1. A receiver for reception of radio frequency comprising a superheterodyne receiver including a mixer tube and a dual wound primary winding on the antenna tuning coil, said antenna being connected to one end of one of the primary windings of the antenna tuning coil, the other end of this winding being connected to a common junction between the two primary windings; and a fixed tuned coil resonant at the intermediate frequency of the superheterodyne part of the receiver and connected to said antenna and to the input of a second mixer tube, the output of said second mixer tube being connected to the other end of the said dual primary winding of the antenna tuning coil, the local oscillator of said superheterodyne being connected to the inputs of both mixer tubes, whereby beating of the frequency of the local oscillator against the frequency of the said fixed tuned coil connected to the second mixer tube will reconstitute broadcast frequency noise impulses, free of broadcast signals, for introduction into the second primary winding of said tuning coil.

2. A receiver adjustable for the reception of electromagnetic waves of any desired frequency, said receiver comprising an input tuning coil having two primary windings; an oscillator; a tuned coil resonant at an intermediate frequency; a mixer tube having its input connected to said oscillator, one end of each of the said primary windings of the tuning coil being connected to a common junction, the other end of one of said primary windings being connected to the receiver antenna, while the other end of the other of said primary windings is connected to the output of the mixer tube; and a connection between the receiver antenna and the input of the mixer tube, including the tuned coil; the connections of the two primary windings of the said tuning coil being so chosen that the only electrical impulses affecting the secondary of the tuning coil are those impulses of desired frequency appearing in that primary winding of the tuning coil which is connected to the antenna.

3. A receiver for the reception of electromagnetic waves of any desired frequency, said receiver comprising an input tuning coil having two primary windings; a local oscillator a fixed, tuned coil resonant at an intermediate frequency; a mixed tube, one end of each of the two primary windings of the tuning coil being connected to a common junction, the other end of one of said primary windings being connected to the receiver antenna, while the other end of the other of said primary windings is connected to the output of the mixer tube; and a connection between the oscillator and the input of said mixer tube and between the oscillator and tuning coil, said oscillator and the said tuning coil operating at a predetermined frequency difference, and said tuned coil operating at said difference in frequencies, whereby the only electrical impulses affecting the secondary of the tuning coil are those impulses of desired frequency appearing in that primary winding of the tuning coil which is connected to the antenna.

References Cited in the file of this patent

UNITED STATES PATENTS

| | | |
|---|---|---|
| 1,526,852 | Hammond | Feb. 17, 1925 |
| 1,824,803 | Bruce | Sept. 29, 1931 |
| 1,981,457 | McCaa | Nov. 20, 1934 |
| 2,000,142 | Loewenstein | May 7, 1935 |
| 2,227,415 | Wolff | Dec. 31, 1940 |
| 2,422,374 | Strebe | June 17, 1947 |
| 2,601,510 | Frye | June 24, 1952 |

FOREIGN PATENTS

| | | |
|---|---|---|
| 912,328 | France | Apr. 23, 1946 |